United States Patent
Barker

(10) Patent No.: US 9,773,211 B2
(45) Date of Patent: Sep. 26, 2017

(54) SYSTEMS AND METHODS FOR INTERACTIVE GRAPHS FOR BUILDING PENALIZED REGRESSION MODELS

(71) Applicant: SAS Institute Inc., Cary, NC (US)

(72) Inventor: Clayton Adam Barker, Cary, NC (US)

(73) Assignee: SAS Institute Inc., Cary, NC (US)

( * ) Notice: Subject to any disclaimer, the term of this patent is extended or adjusted under 35 U.S.C. 154(b) by 440 days.

(21) Appl. No.: 14/597,988

(22) Filed: Jan. 15, 2015

(65) Prior Publication Data

US 2015/0331963 A1 Nov. 19, 2015

Related U.S. Application Data

(60) Provisional application No. 62/000,519, filed on May 19, 2014.

(51) Int. Cl.
*G06F 17/30* (2006.01)
*G06N 99/00* (2010.01)
*G06F 3/0481* (2013.01)

(52) U.S. Cl.
CPC ....... *G06N 99/005* (2013.01); *G06F 3/04812* (2013.01); *G06F 17/30554* (2013.01); *G06F 17/30958* (2013.01)

(58) Field of Classification Search
None
See application file for complete search history.

(56) References Cited

U.S. PATENT DOCUMENTS

| | | |
|---|---|---|
| 6,374,216 B1 | 4/2002 | Micchelli et al. |
| 7,346,736 B1 | 3/2008 | Gluhovsky et al. |
| 7,398,191 B1 | 7/2008 | Gluhovsky et al. |
| 7,401,012 B1 | 7/2008 | Bonebakker et al. |
| 7,729,891 B2 | 6/2010 | Fine et al. |
| 7,865,340 B2 | 1/2011 | Fine et al. |
| 7,933,850 B1 | 4/2011 | Urmanov et al. |
| 8,032,473 B2 | 10/2011 | Rice |
| 8,039,686 B2 | 10/2011 | Podlich et al. |
| 8,255,346 B2 | 8/2012 | Abe et al. |
| 8,510,255 B2 | 8/2013 | Fadell et al. |
| 8,606,774 B1 | 12/2013 | Makadia |

(Continued)

OTHER PUBLICATIONS

Hui et al., Regularization and variable selection via the elastic net, 2005, J. R. Statist. Soc. B, 67, Part 2, pp. 301-320.*

(Continued)

*Primary Examiner* — Alan Chen
(74) *Attorney, Agent, or Firm* — Bell & Manning, LLC

(57) ABSTRACT

A graphical display of values generated according to a penalized regression model for multiple parameters of a data set shows the values as a graph having a first axis that represents magnitude of multiple parameter estimates of the penalized regression model and having a second axis that represents parameter estimate values of the multiple parameters of the penalized regression model. A user input is received that comprises a change to a parameter handle of the graphical display and changes at least one data parameter of the penalized regression model. The graphical display is changed such that the graphical display shows a representation of the values for the penalized regression model in accordance with the changes.

45 Claims, 13 Drawing Sheets

(56) References Cited

U.S. PATENT DOCUMENTS

| 8,626,680 B2 | 1/2014 | Lozano et al. |
| 2007/0122041 A1 | 5/2007 | Moghaddam et al. |
| 2007/0156471 A1 | 7/2007 | Moghaddam et al. |
| 2009/0210371 A1 | 8/2009 | Laan |

OTHER PUBLICATIONS

Kyung et al., Penalized Regression, Standard Errors, and Bayesian Lassos, 2010, Bayesian Analysis, 5, No. 2, pp. 369-412.*
SAS Institute Inc., SAS/STA® 13.1 User's Guide (2013) retrieved from http://support.sas.com/documentation/onlinedoc/stat/131/statug.pdf 13 pages.
Friedman et al., "Package 'lmnet' Lasso and elastic net regularized linear models" Version 1.9-8 (May 24, 2014) 22 pages.
Glmnet_inside-R A community Site for R-Sposored by Revolution Analytics retrieved from http://www.inside-r.org/packages/cran/glmnet/docs/glmnet Jun. 4, 2014, 5 pages.
Kellie J. Archer "glmnetcr: An R Package for Ordinal Response Prediction in High-Dimensional Data Settings" Virginia Commonwealth University, (2014) 10 pages.

* cited by examiner

SYSTEMS AND METHODS FOR INTERACTIVE GRAPHS FOR BUILDING PENALIZED REGRESSION MODELS

CROSS-REFERENCE TO RELATED APPLICATIONS

The present disclosure claims the benefit of priority under 35 U.S.C. §119(e) to U.S. Provisional Application No. 62/000,519 filed on May 19, 2014 and titled "An Interactive Graph for Building Penalized Regression Models", the entirety of which is incorporated herein by reference.

TECHNICAL FIELD

The present disclosure generally relates to computer-implemented systems and methods for graphs related to analysis of data sets.

BACKGROUND

Studying data sets and characterizing data sets to discern otherwise unrecognized trends in the data can be aided by graphs based on the data sets. Graphs are often used to help study and analyze data sets in many fields, for example, health data, actuarial data, and marketing data.

SUMMARY

In accordance with the teachings provided herein, systems and methods for presenting an interactive graphical display of values generated according to a penalized regression model for multiple parameters of a data set are provided.

In accordance with the disclosure, the interactive graphical display shows the values as a graph having a first axis that represents magnitude of multiple parameter estimates of a penalized regression model and having a second axis that represents parameter estimate values of the multiple parameters of the penalized regression model. A user input is received that comprises a request for changing the graphical display of the representation of values. The received user input request comprises a change to a parameter handle of the graphical display, such that the change in the parameter handle indicates a change to at least one data parameter of the penalized regression model. Changes to the represented values of the penalized regression model are calculated in response to the received user input request. The graphical display is changed such that the graphical display shows a representation of the values for the penalized regression model in accordance with the calculated changes.

BRIEF DESCRIPTION OF THE DRAWINGS

Like reference numbers and designations in the various drawings indicate like elements.

DETAILED DESCRIPTION

This disclosure relates to generating graphs of data. Graphs can be helpful in building statistical models for data analysis. For example, regression models are often used in data analysis. Current techniques for generating graphs require the user to manually create graphs for the data set being analyzed. In addition, the user may be required to determine what graph types are desirable as well as determine particular variables of the data set to utilize. Manually creating graphs, determining graph types to use, and determining variables to utilize for data analysis can be tedious, inaccurate, and difficult. This application discloses a system and associated techniques for a user interface that provides an interactive graph for building penalized regression models. Certain aspects of the disclosed subject matter provide unique features for a graph that enables the user to interactively build penalized regression models. The disclosed techniques make it easier for the user to explore and use other graph fits that may not fit the data best, but may be more desirable for other reasons (such as being more parsimonious). This ability to modify the otherwise-final model is helpful for both building better predictive models and also for understanding the underlying methodology. Using the techniques disclosed herein, a user is able to quickly and easily explore multiple candidate regression models simply by pointing and clicking via the user interface. Exploring models via conventional interfaces generally requires more tedious and time-consuming efforts that involve writing potentially many lines of code to generate candidate data models, and then manually sifting through the results of the candidate models one at a time. The interactive solution path disclosed herein makes this process much easier and much faster.

Penalized regression is a statistical analysis method for performing variable selection and building predictive models. However, penalized regression techniques do not result in a single model. Instead, penalized regression techniques yield a sequence of "fits" that can be summarized in a single graph called a solution path. That is, each fit is just a single fit or model of a graph that approximates the data, but when the information from all the fits is combined, a single graph called the solution path is obtained. The best fit can be represented by the solution path and can be chosen based on some goodness-of-fit measure. The techniques disclosed herein may be performed within a computer-implemented environment that provides a graphical user interface (GUI) in which a user can manipulate graphs of data sets to determine solution paths and build suitable regression models.

Figure 1:
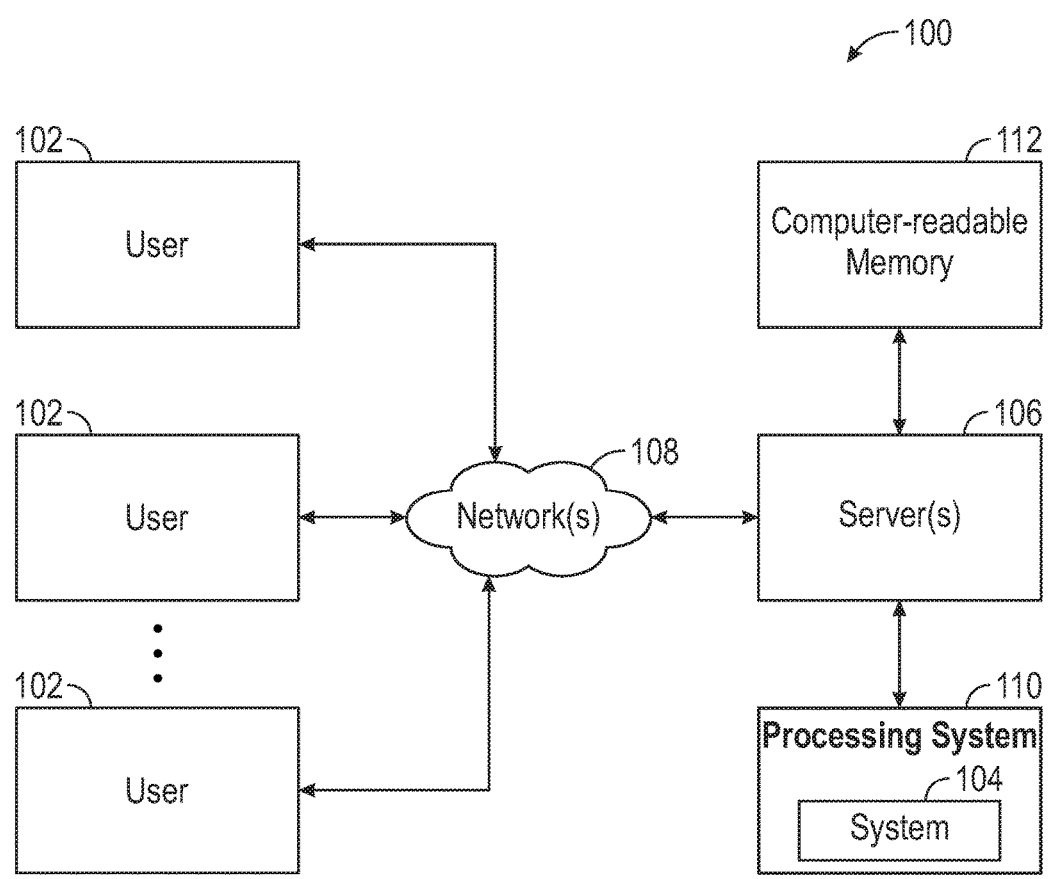
FIG. 1 illustrates a block diagram of an example of a computer-implemented environment for automated generation of graphs related to a data set.

FIG. 1 illustrates a block diagram of an example of a computer-implemented environment 100 for generating transaction scores related to financial transactions involving a customer account. Users 102 can interact with a computer system 104 through a number of ways, such as one or more servers 106 over one or more networks 108. The computer system 104 can contain software operations or routines. That is, the servers 106, which may be accessible through the networks 108, can host the computer system 104 in a client-server configuration. The computer system 104 can also be provided on a stand-alone computer for access by a user. The users may include, for example, a person at a terminal device who is requesting authorization for a financial transaction relating to an account.

In one example embodiment, the computer-implemented environment 100 may include a stand-alone computer architecture where a processing system 110 (e.g., one or more computer processors) includes the computer system 104 on which the processing system is being executed. The processing system 110 has access to a computer-readable memory 112. In another example embodiment, the computer-implemented environment 100 may include a client-server architecture, and/or a grid computing architecture. Users 102 may utilize a personal computer (PC) or the like to access servers 106 running a computer system 104 on a processing system 110 via the networks 108. The servers 106 may access a computer-readable memory 112.

Figure 2:
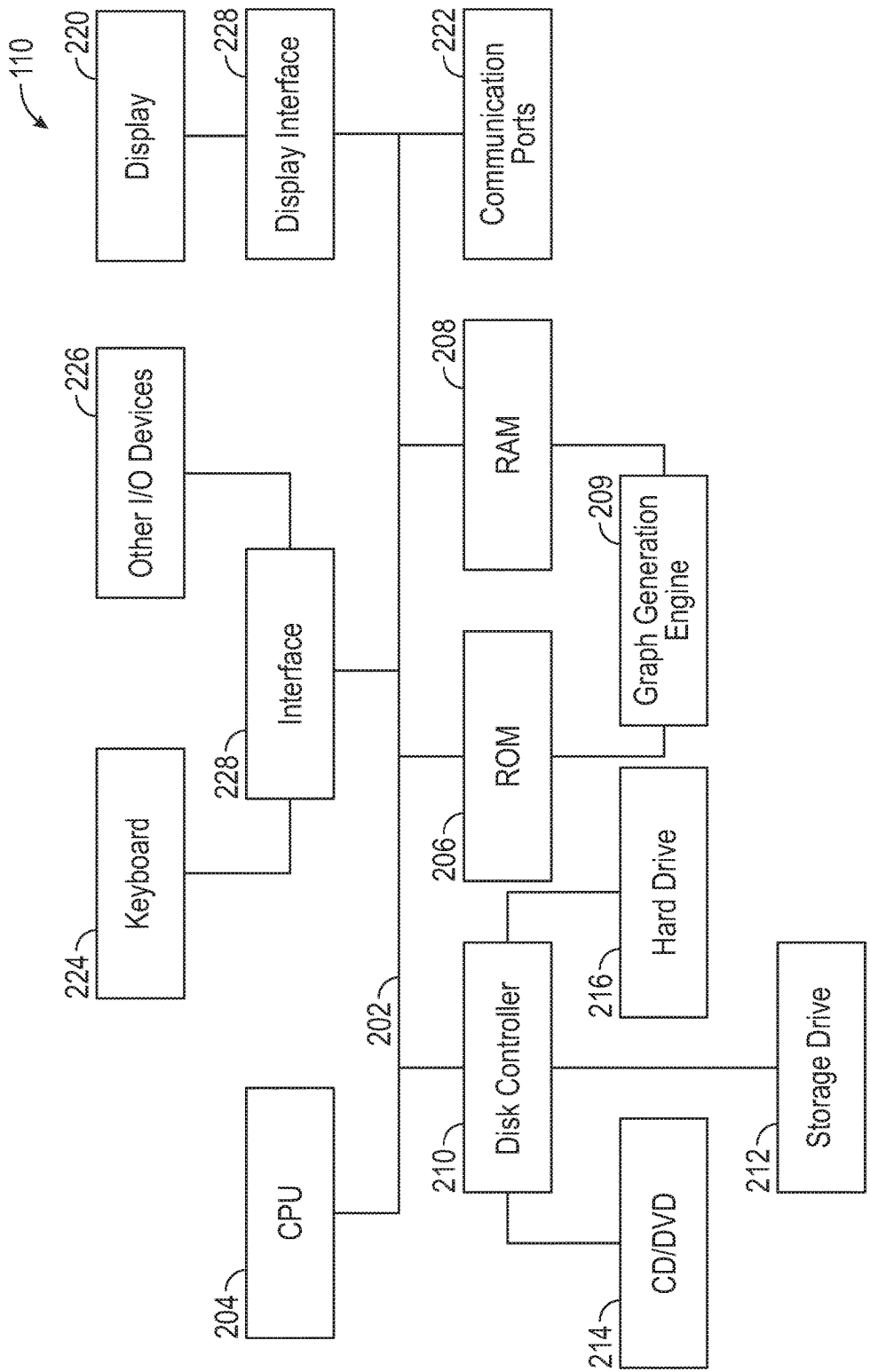
FIG. 2 illustrates a block diagram of an example of a processing system of FIG. 1 for generating one or more graphs related to a data set.

FIG. 2 illustrates a block diagram of an example of a processing system of FIG. 1 for generating transaction scores related to financial transactions involving a customer account. A bus 202 may interconnect the other illustrated components of the processing system 110. A central processing unit (CPU) 204 (e.g., one or more computer processors) may perform calculations and logic operations used to execute a program. A processor-readable storage medium, such as read-only memory (ROM) 206 and random access memory (RAM) 208, may be in communication with the CPU 204 and may contain one or more programming instructions. Optionally, program instructions may be stored on a computer-readable storage medium, such as a magnetic disk, optical disk, recordable memory device, flash memory, or other physical storage medium. Computer instructions may also be communicated via a communications transmission, data stream, or a modulated carrier wave. In one example, program instructions implementing a transaction processing engine 209, as described further in this description, may be stored on a storage drive 212, hard drive 216, read only memory (ROM) 206, or random access memory (RAM) 208, or may exist as a stand-alone service external to the stand-alone computer architecture.

A disk controller 210 can interface one or more optional disk drives to the bus 202. These disk drives may be external or internal floppy disk drives such as the storage drive 212, external or internal CD-ROM, CD-R, CD-RW, or DVD drives 214, or external or internal hard drive 216. As indicated previously, these various disk drives and disk controllers are optional devices.

A display interface 218 may permit information from the bus 202 to be displayed on a display 220 in audio, graphic, or alphanumeric format. Communication with external devices may optionally occur using various communication ports 222. In addition to the standard computer-type components, the hardware may also include data input devices, such as a keyboard 224, or other input/output devices 226, such as a microphone, remote control, touchpad, keypad, stylus, motion, or gesture sensor, location sensor, still or video camera, pointer, mouse or joystick, which can obtain information from the bus 202 via the interface 228.

As noted above, systems and methods for presenting an interactive graphical display of values generated according to a penalized regression model for multiple parameters of a data set are provided.

Figure 3:
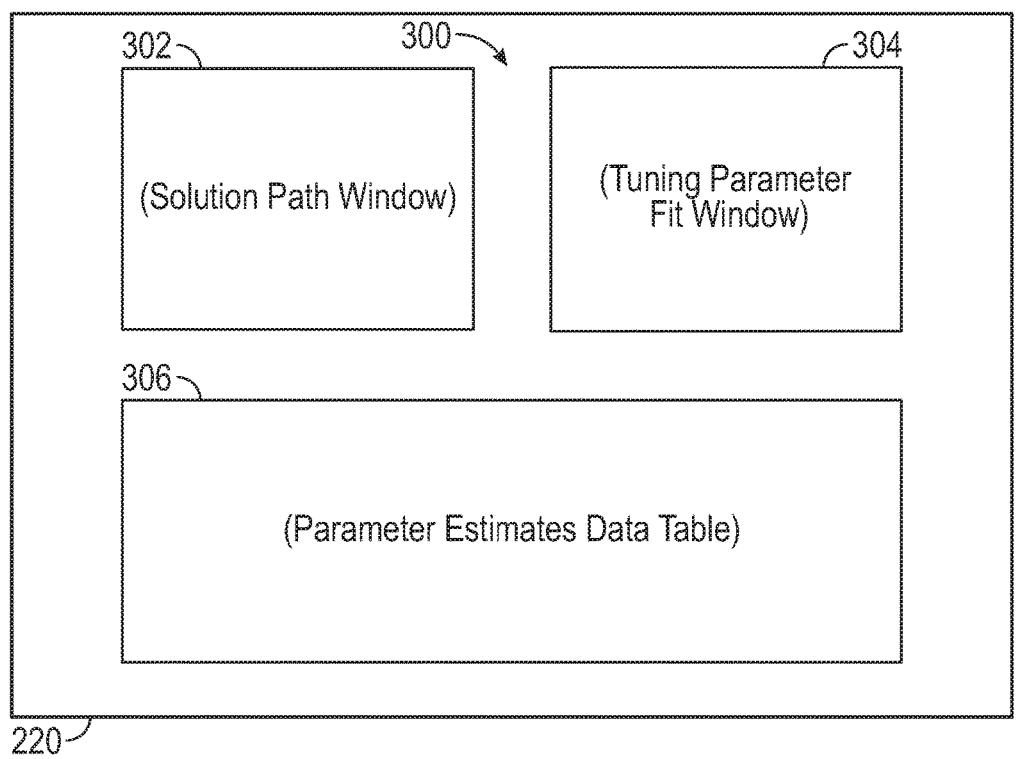
FIG. 3 illustrates an example of a graphical user interface that is configured to be utilized for providing a number of generated graphs related to a data set.

FIG. 3 illustrates an embodiment of a graphical user interface in which the models and associated statistics are displayed to a user. That is, the boxes or windows in FIG. 3 show the relative position of graphs and data of an embodiment constructed in accordance with this disclosure. Details with respect to an embodiment are illustrated, for example, in FIG. 5, which is discussed further below. FIG. 3 shows a computer display 300 in a GUI environment of a computer that provides an example of a graphical user interface comprising a number of generated graphs related to a data set. The processing system 110 (FIG. 1) includes a display 220 (FIG. 2) on which data from a data set is graphed in an interactive presentation 300 according to a penalized regression model for the data set. FIG. 3 shows that the embodiment provides a graphical display for the regression model, in accordance with this disclosure, with a solution path window 302 on the left side of the display and a tuning parameter fit window 304 on the right side of the display. A parameter estimates data table 306 is placed below the two graph windows 302, 304.

A penalized regression model, as used by the techniques disclosed herein, is a model for fitting (i.e., estimating) a group of parameters to a data set. Estimated values for the parameters may be fitted to graphs of data sets, based on a regression model using a calculated tuning parameter. The regression model provides estimated coefficient values for the parameters on which the model is based.

More particularly, the coefficients of the parameters are typically referred to as a coefficient set "β", and when building a penalized regression model, the coefficients (β) in the model are estimated using the mathematical formula as follows:

$$\hat{\beta} = \underset{\beta}{\operatorname{argmin}} - \operatorname{likelihood}(\beta) + \lambda * \operatorname{penalty}(\beta)$$

It should be apparent that the model produced will depend on the choice of λ, which is generally referred to as a "tuning parameter", in the mathematical formula for the estimated value of the coefficient set "β". The model described herein includes a "penalty" value, as known to those skilled in the art, hence the technique for data representation is referred to as a "penalized regression model". Typically, a range of values for the tuning parameter λ are utilized, and varying the value of the tuning parameter over a range of values leads to a variety of solution paths. Each solution path corresponds to a different set of estimated values for the coefficient set "β", each of which is a candidate model to be selected for a solution path against which the data set will be subjected to, for analysis. One of the candidate models will comprise a "best fit" to the data set (generally based on a goodness-of-fit measure) and the corresponding tuning parameter value is the tuning parameter value that is used for the default solution in the "solution path" graph 302 (FIG. 3). That is, varying the tuning parameter over a range of values creates a sequence of candidate models. A solution path, in general, is a graphical summary of the estimated coefficient set (i.e., the beta values) for a corresponding value of the tuning parameter. The value of the tuning parameter that produces the "best fit" to the data set defines the default solution, the solution path defined by the initial set of parameters displayed for the penalized regression model, as presented by the system. That is, the initial solution path is the set of parameter values (the estimated coefficient set for "β") where the user is started in the illustrated embodiment (e.g., the best fit is denoted by the vertical dashed line 655 in FIG. 6, as described further below).

Figure 4:
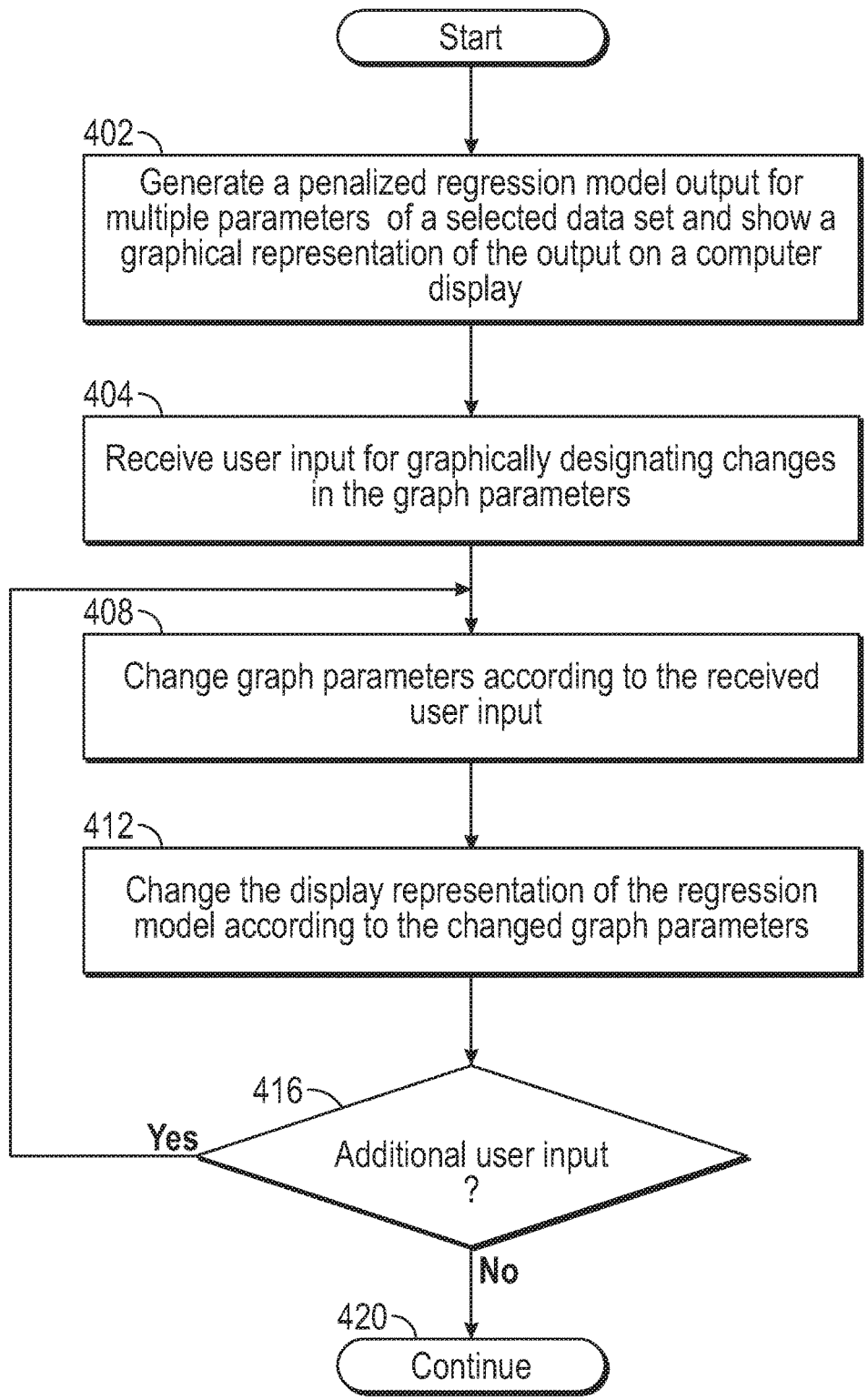
FIG. 4 illustrates an example of a flow diagram for generating, by a graph generation engine, a number of graphs related to a data set.
Figure 5:
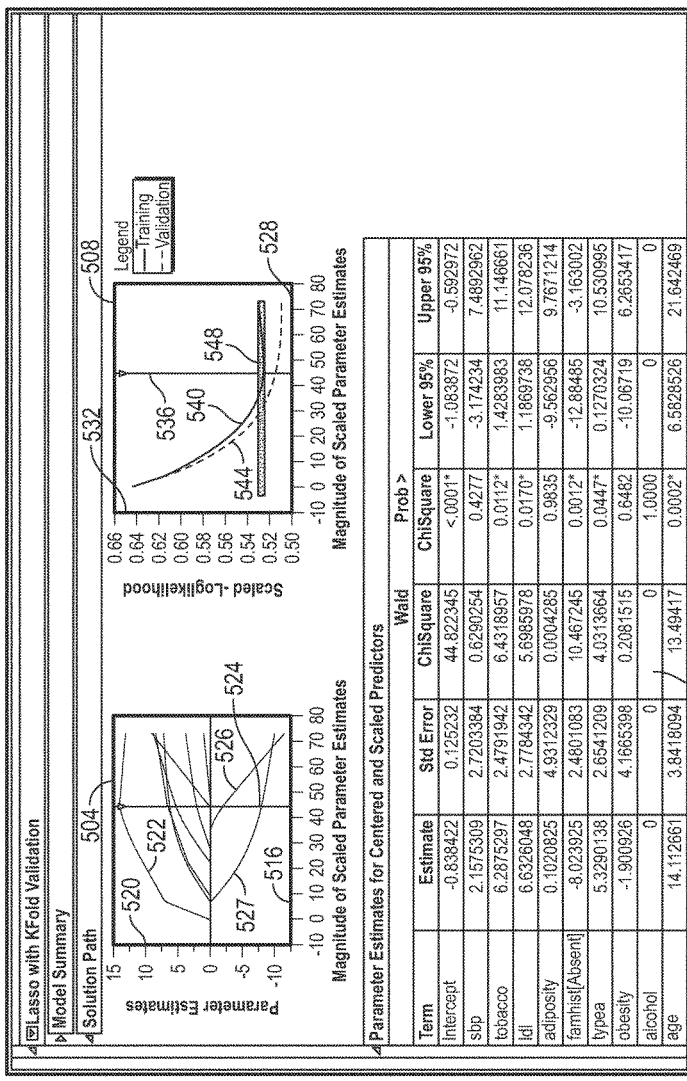
FIG. 5 illustrates an example of a graphical user interface that is configured to be utilized for providing a number of generated graphs related to a data set.
Figure 6:
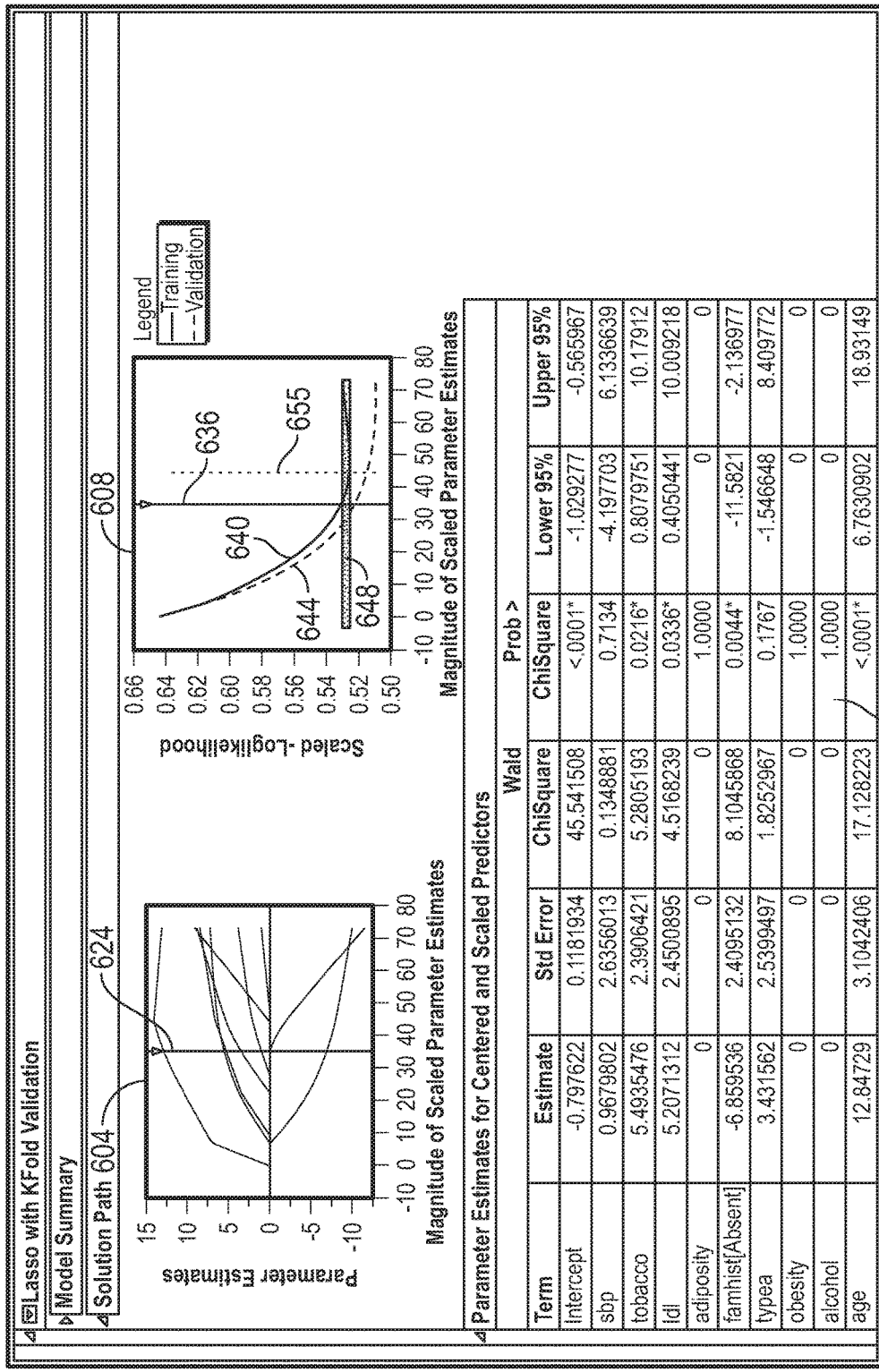
FIG. 6 illustrates an example of a graphical user interface that is configured to be utilized for providing a number of generated graphs related to a data set.

As noted above, the interactive graphical display in accordance with this disclosure shows data values as a graph having a first axis that represents magnitude of multiple parameter estimates of the penalized regression model and having a second axis that represents parameter estimate values of the multiple parameters of the penalized regression model. A user input is received that comprises a change to a parameter handle of the graphical display and the user input changes at least one data parameter of the penalized regression model. The graphical display is changed accordingly, such that the graphical display shows a representation of the values for the penalized regression model in accordance with the changes due to the user input. FIG. 4 illustrates an example of a flow diagram for generating the interactive graph; FIG. 5 and FIG. 6 show examples of the graphical user interface for providing the graphs to the user.

FIG. 4 illustrates an example of a flow diagram for generating, by a graph generation engine, a number of interactive penalized regression graphs related to a data set. In the first operation, indicated by the box 402 of FIG. 4, a graphing computer system generates a penalized regression model output for multiple parameters of a selected data set and shows a graphical representation of the output on a computer display of the system. The generated graphical representation of the output is illustrated in the "solution path" diagram window 302 (FIG. 3), an example of which is illustrated in the solution path window 504 of FIG. 5.

In the next operation, indicated by the box 404 of FIG. 4, the graphing computer system receives a user input for graphically designating changes in the graph parameters. The user input may comprise, for example, a user selection of a display artifact via a mouse click, followed by user manipulation of the selected artifact or display portion by movement of the mouse such that parameter values are changed corresponding to movement of the selected display artifact using the graphical user interface (GUI) of the graphing computer system. Changing a parameter value by means of a graphical manipulation through a GUI provides an interactive means of changing a parameter value, and is an easier process for a user as compared to conventional techniques that require deliberate, user-entered alphanumeric inputs to effectuate data change.

In the next operation, indicated by the box 408 of FIG. 4, the graphing computer system changes graph parameters according to the received user input. The graphing computer system can perform calculations in response to the changed values and in this way can update the solution path. Such calculations are performed by the graphing computer system in substantially real time, in response to the user selecting a display artifact to indicate the parameter to be changed, and in response to changes in the parameter that are indicated as the user moves the selected display artifact. That is, the graphing computer system retrieves updated parameter estimates that were previously calculated, or makes calculations to error statistics and confidence intervals in response to the changed values, and makes corresponding changes to the display, to implement changes to the selected parameter as the user manipulates, or moves, the selected display artifact in the display 220. As described further below, the user may indicate parameter changes by means of different GUI actions.

In the next operation, box 412 in FIG. 4, the graphing computer system changes the display representation of the regression model according to the changed graph parameters indicated by the user input. The details of such operation will be known to those skilled in the art. That is, once the changes to the display values for the graph are calculated in real time, the graph generation engine 209 (FIG. 2) can implement the changes using conventional techniques for graphical display of data.

The operations of box 408 and 412 are repeated for as long as user input is received. This is represented by the FIG. 4 boxes showing that, in the next operation, indicated by the decision box 416, the graphing computer system responds to any additional user inputs. For example, if a user continues to change a data parameter, as with continuing to move or drag the selected display artifact from the box 404, an affirmative outcome at the box 416, the operation will return to the box 408 operation to receive graph parameter changes according to the continuing display artifact movement or changing to the display on the part of the user through the GUI. If there is no additional user input, a negative outcome at the decision box 416, the system continues with further alternative operation, represented by the continuation box 420.

The processing of the FIG. 4 operations may be better understood with reference to the remaining drawings, which illustrate the graphical display and changes to the display initiated by user input through the GUI.

FIG. 5 illustrates an example of a graphical user interface display 500 that is configured to be utilized for providing a number of generated graphs related to a data set, in an interactive manner and in accordance with the template that is illustrated in FIG. 3. The FIG. 5 display 500 shows a solution path window 504 at a left side of the display and shows a tuning parameter fit window 508 on the right side of the display. A parameter estimates data table 512 is shown at the bottom of the display, beneath the two graph windows 504, 508. The solution path window 504 shows a graph that comprises a representation of values generated according to a penalized regression model for multiple parameters of a data set. The graph in the solution path window 504 shows the represented values as a graph having a first axis 516 that represents the magnitude of multiple parameter estimates of the penalized regression model and having a second axis 520 that represents parameter estimate values of the multiple parameters of the penalized regression model.

The multiple data curves in the solution path window 504 show solution paths of penalized regression models that correspond to different values of the parameter coefficients (the estimated coefficient sets for "β"). For example, a top-most curve 522 in FIG. 5 starts with a parameter value of zero (i.e., magnitude of estimate=0 on the horizontal axis 516) toward the left side of the solution path window 504 and then begins to increase sharply upward as the curve 522 extends to the right, with a bend in the curve at approximately a tuning parameter estimate coefficient magnitude of about 7 along the horizontal axis 516, increasing more moderately to a maximum tuning parameter value of approximately 45 along the horizontal axis 516, and then begins to decrease slightly toward the right of the graphed curve 522 in the window 504. That is, the penalized regression model display of FIG. 5 shows a multivariate model of a data set, such that the different data curves in the solution path window 504 correspond to different values of various parameter estimate coefficients (variables) of the model. For example, the estimated parameter values of different regression models correspond to the intersection of the vertical tuning parameter line 524 at each of the different parameter curves.

Some of the parameter estimates may be apparent from inspection of the display 500. For example, in FIG. 5, in the solution path window 504 on the left, the top coefficient line 522 intersects the vertical "best fit" line 524 at a parameter estimated coefficient (y-axis) value of approximately 14.0, which in the table 512 corresponds approximately to the estimate for the "age" parameter (see the last row in the table column labeled "Estimate"). Therefore, the top coefficient line 522 corresponds to the "age" parameter graph values. Similarly, the graph line 526 in the window 504 with a "best fit" line 524 intercept of about −2.0 corresponds approximately to the parameter estimate for the "obesity" parameter in the table 512. Therefore, that graph line 526 corresponds to values for the "obesity" parameter. A similar analysis for identification of coefficient lines may be applied, for example, to FIGS. 6 and 7.

It should be understood that conventional data analysis techniques provide a static report display that may appear similarly to the static illustration in FIG. 5, in which multiple graphs are provided. In such conventional techniques, a user may review the illustrated graphs, decide which of the solution path fits might be more desirable, and then write more code to obtain that fit and use it for further analysis. In contrast, the disclosed embodiment provides an interactive graphical environment in which a user can select the tuning parameter (either one of line 524 or 536 in FIG. 5) in the user interface display and can drag the tuning parameter line in the user interface display, changing the tuning value correspondingly, such that the effects of different tuning parameter values can be observed in substantially real time. That is, as the tuning parameter handle 524, 536 is moved left and right, the corresponding parameter estimates for the coefficients in the parameter estimates data table 512 will change. As a result, the interactive process possible with the illustrated embodiments is far easier and faster than conventional techniques that require writing additional code to produce additional solution paths for further analysis.

For the solution path display of FIG. 5, the tuning parameter noted above, as used in the penalized regression model, is indicated by the position of the tuning parameter handle 524 in the solution path display. As described further below, the tuning parameter handle 524 is represented in the display 500 by a vertical bar having a downward-pointing triangle, which is used to indicate that the tuning parameter handle is movable by a user interface "select-and-drag" operation that is typical for a GUI implementation. That is, in the display 500 of FIG. 5, the initial or default "solution path" value of the tuning parameter is the combination of data parameter values that produce the best fit to the data, and is illustrated by the placement of the tuning parameter handle 524 in the window 504. The graphical interface environment provides an interface in which a user may change the value of the tuning parameter by selecting the tuning parameter handle 524 with a display cursor of the GUI and by dragging the tuning parameter handle to a new position in the graph window 504, either by dragging to the left or dragging to the right. In alternative configurations, the graphical interface environment may be implemented in, for example, a touch screen interface in which a user selects a display artifact via touching and dragging, or by verbal command to a computer display that results in selection and manipulation of display artifacts.

The tuning parameter fit window 508 on the right side of the display 500 shows represented data values as a graph of scaled parameter estimates against a tuning parameter selection criteria to indicate the quality of the model fit to the data. For example, in the FIG. 5 embodiment, the window 508 shows a first axis 528 that represents the magnitude of multiple parameter estimates of the penalized regression model and a second axis 532 that represents parameter estimate values of the multiple parameters of the penalized regression model according to a scaled-log likelihood index. The second axis 532 is not necessarily always the scaled log-likelihood, but rather depends on the method chosen for picking the best tuning parameter. In the illustrated embodiment, the tuning parameter is selected as a function of the likelihood. That is, when a form of cross-validation is used for parameter selection, the index of the second axis is typically the scaled negative log likelihood. But if an information criteria is selected instead for picking the tuning parameter, then the second axis is typically the information criteria. The illustrated embodiment supports multiple different options for cross-validation and information criteria. In particular, the illustrated embodiment supports selection criteria comprising a Bayesian Information Criteria and an Akaike Information criteria.

Within the tuning parameter fit window 508 of FIG. 5, the tuning parameter value as previously described as the handle 524 is represented with a corresponding tuning parameter handle 536. That is, the tuning parameter handle 524 in the solution path window 504 and the tuning parameter handle 536 in the tuning parameter fit window 508 indicate the same parameter of the penalized regression model that is illustrated in FIG. 5 and indicate the same value. Moreover, selecting and moving one parameter handle 524, 536 in one of the graph windows 504, 508 through the GUI will cause the graphing computer system to cause the other graph window 508, 504 to also move the handle 536, 524 so as to reflect the new, changed value of the tuning parameter. Thus, a user can select and move either handle 524, 536 to change the tuning parameter value through the GUI. If desired, the system can be configured to provide additional interface refinements. For example, either or both windows 504, 508 can be configured so that moving a cursor to a location within each respective window and clicking on the location will move the tuning parameter line 524, 536 in the respective window to approximately the location, without the need for selecting and dragging the tuning parameter line to the location.

The graph data curves 540, 544 in FIG. 5 show how well each set of parameter values in the penalized regression models fits for a range of tuning parameter values. To implement a penalized regression model, a set of selected parameters is used in a training regimen, from which a training graph curve 544 is drawn, as known to those skilled in the art. After training, a desired data set, such as "actual data" on which analysis is to be performed, may be provided to the trained penalized regression model, and a validation curve 540 may be generated. That is, training and validation data are used when a form of cross-validation is utilized to pick the best value of the tuning parameter. Alternatively, if an information criteria is used to select the tuning parameter instead, then there will only be a single line of an information criteria curve in the window 508, as known to those skilled in the art.

In FIG. 5, a graph 540 of the validation data outcome in the vicinity of the tuning parameter value is illustrated, along with a graph 544 of the training data outcome in the vicinity of the tuning parameter value. The validation graph 540 shows how well the penalized regression model fits on the validation data and the training data graph 544 shows how well the penalized regression model, selected according to position of the tuning parameter handle 524, 536, fits on the training data. In order to generalize well to new observations, it is preferable that the selected regression model should fit well (should be close to) the validation data. It should be apparent that the tuning parameter value in FIG. 5 is located at a value for which the validation data fits the model rather well, as indicated by the proximity of the validation graph 540 to the horizontal bar 548.

More particularly, when a cross-validation technique for the penalized regression model is utilized to choose the best penalized regression model (the parameter set) from the solution paths, one portion of the data set is used to build the model and another portion of the data set is used to see how well the built model fits the data set. It is preferable to build a model that will generalize well to new data (i.e., new observations). If a model fits well on the validation data from the data set, then it is reasonable to believe that it will also perform well for new observations that are added to the data set. Thus, the dashed graph line 544 summarizes how well the model fits the training data as the tuning parameter is changed. In the illustrated circumstance, smaller (lower magnitude of scaled likelihood value) is better than larger. In addition, the solid graph line 540 summarizes how well the model fits the validation data as a function of the tuning parameter. Again, a smaller magnitude is better than a larger magnitude.

Thus, the best model is obtained following the validation graph curve 540 as it decreases along the horizontal axis 528 moving from left to right, to where the tuning parameter is near the minimum value of the validation graph curve (i.e., near the magnitude "45.0" on the horizontal axis 528) and afterwards, farther to the right along the horizontal axis, the model starts to perform slightly worse again as the magnitude of the line 540 values increase. In this way, the horizontal bar 548 defines a range of values of the tuning parameter where the model would be expected to fit as well as the best model. The range is represented by the thickness of the horizontal bar 548. Thus, the best fit is at about 45.0 on the horizontal axis 528, but if the tuning parameter is decreased to approximately 40.0 along the horizontal axis, that model would be expected to perform as well. In this way, the horizontal bar 548 is a graphical representation of goodness-of-fit for the parameter estimate values of multiple penalized regression models. Those skilled in the art will appreciate that the rules for defining the horizontal bar 548 are generally well accepted in the statistics literature.

FIG. 6 illustrates an example of a graphical user interface display 600 that is configured to be utilized for providing a number of generated graphs related to a data set. The display 600 shows a solution path window 604 at a left side of the display and shows a tuning parameter fit window 608 on the right side of the display. A parameter estimates data table 612 is shown at the bottom of the display, beneath the two graph windows 604, 608. The display 600 reflects a changed position of the tuning parameter handles 624, 636 in each respective graph window 604, 608 as compared to the FIG. 5 display and, in accordance with this disclosure, the changed position is reflected in a corresponding changed value for the tuning parameter 624, 636 and for the values in the parameter estimates data table 612. The "default" value of the tuning parameter, determined according to a "best fit" data analysis by the system, is represented in FIG. 6 by the dashed vertical line 655 in the tuning parameter fit window 608. As with the bar 548 in FIG. 5, a graphical representation of goodness-of-fit for the parameter estimate values of multiple penalized regression models is illustrated in FIG. 6 by the horizontal bar 648. Those skilled in the art will appreciate that the rules for defining the horizontal bar 648 are generally well accepted in the statistics literature. As with the FIG. 5 embodiment, the user may change the value of the tuning parameter by selecting either tuning parameter handle 624, 636 with a display cursor of the GUI and by dragging the tuning parameter handle to a new position in either graph window 604, 608, either by dragging to the left or dragging to the right.

More particularly, it is readily evident that the changed position in the tuning parameter handles 624, 636 is reflected in corresponding changed values of the tuning parameter by observation of the location on the horizontal axis (x-axis) of each graph window 604, 608 through which the tuning parameter handle passes. The FIG. 6 graphs 604, 608 indicate a tuning parameter value of approximately 35.0, whereas the FIG. 5 location and corresponding value indicate a tuning parameter value of approximately 45.0. Similarly to the illustration of FIG. 5, the illustration of FIG. 6 shows a graph 640 of the validation data outcome in the vicinity of the tuning parameter value, along with a graph 644 of the training data outcome in the vicinity of the tuning parameter value. The validation graph 640 shows how well the penalized regression model fits on the validation data and the training data graph 644 shows how well the penalized regression model, selected according to position of the tuning parameter handle 624, 636 fits on the training data. It should be noted that the tuning parameter fit window 608 in FIG. 6 shows a corresponding difference in the fit to the model, as compared to the fit in the corresponding display 500 of FIG. 5. In addition, comparison of FIG. 5 with FIG. 6 as to the respective data tables 512, 612 illustrates that the regression coefficients listed in the data tables also are updated with the change in the tuning parameter value.

Figure 7:
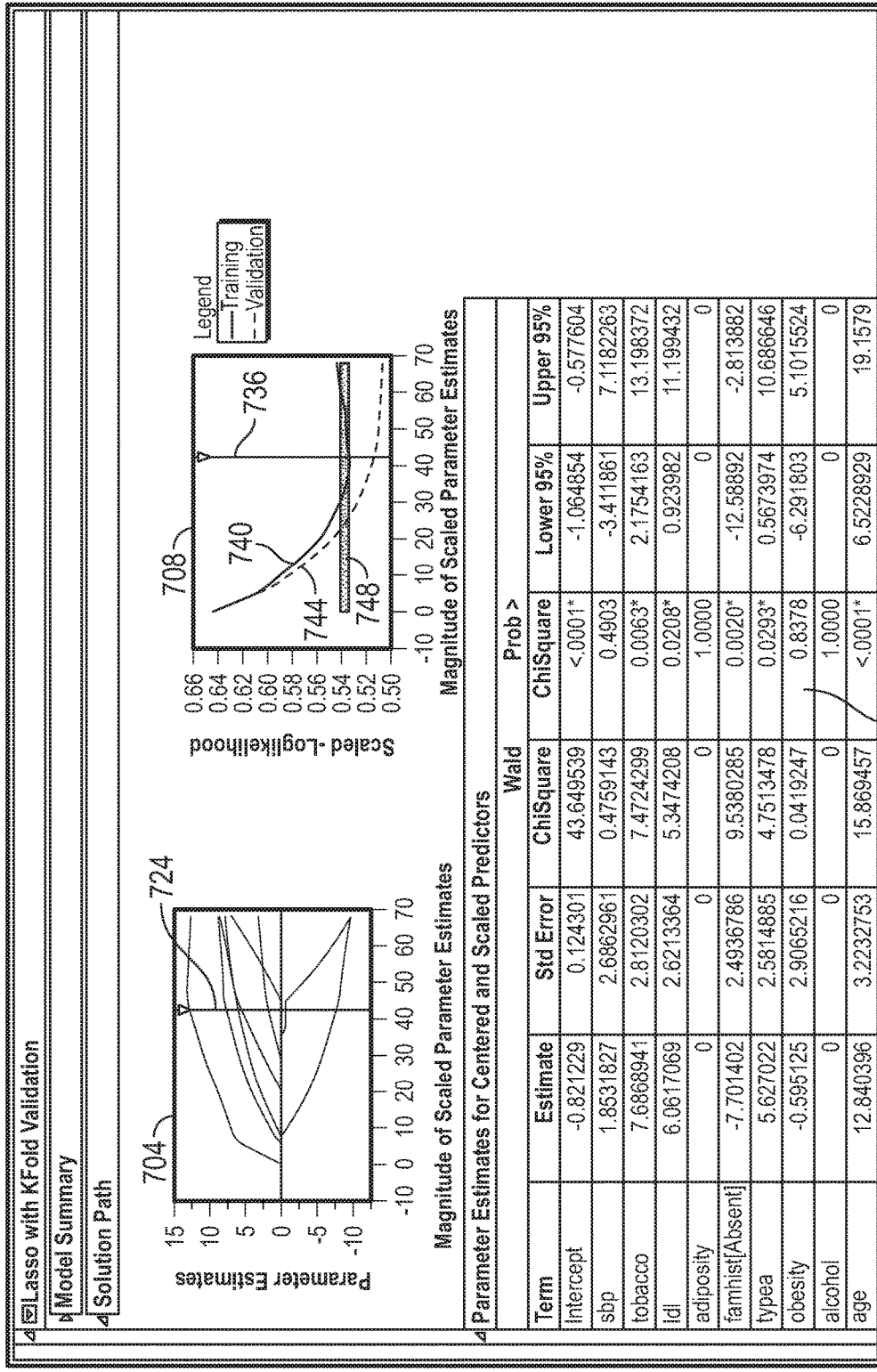
FIG. 7 illustrates an example of a graphical user interface that is configured to be utilized for providing a number of generated graphs related to a data set.

FIG. 7 illustrates an example of a graphical user interface display 700 that is configured to be utilized for providing a number of generated graphs related to a data set. The display 700 shows a solution path window 704 at a left side of the display and shows a tuning parameter fit window 708 on the right side of the display. A parameter estimates data table 712 is shown at the bottom of the display. FIG. 7 shows respective tuning parameter handles 724, 736 that are each shown with a location and corresponding value that are intermediate between the illustrated locations and values of FIG. 5 and FIG. 6. It should be noted that, once again, the changed position of the tuning parameter handle 724, 736 are reflected in different graph window representations 704, 708 and different data table values 712. Likewise, the user may change the value of the tuning parameter by selecting either tuning parameter handle 724, 736 with a display cursor of the GUI and by dragging the tuning parameter handle to a new position in either graph window 704, 708, either by dragging to the left or dragging to the right. This feature applies to all embodiments described herein.

Similarly to the illustrations of FIG. 5 and FIG. 6, the illustration of FIG. 7 shows a graph 740 of the validation data outcome in the vicinity of the tuning parameter value, along with a graph 744 of the training data outcome in the vicinity of the tuning parameter value. The validation graph 740 shows how well the penalized regression model fits on the validation data and the training data graph 644 shows how well the penalized regression model, selected according to position of the tuning parameter handle 724, 736 fits on the training data. Similarly to the illustrations of FIG. 5 and FIG. 6, the illustration of FIG. 7 shows a graphical representation of goodness-of-fit for the parameter estimate values of multiple penalized regression models is illustrated in FIG. 7 by the horizontal bar 748. Those skilled in the art will appreciate that the rules for defining the horizontal bar 748 are generally well accepted in the statistics literature.

A comparison of FIG. 5, FIG. 6, and FIG. 7 will illustrate that moving the tuning parameter handle (and corresponding tuning parameter value) changes the complexity of the penalized regression model that is being viewed in the graphs. As the tuning parameter handle is moved from left to right in the graphs, more parameters (corresponding to nonzero coefficients) from the data set are included in the model, and the model is getting more complex. That is, more data coefficients are nonzero and their magnitudes are getting larger as the tuning parameter is moved from left to right in FIGS. 5, 6, and 7. In general, less complexity is often desirable because reduced complexity makes it easier to explain and use the fitted penalized regression model. Nevertheless, the performance in terms of validation is often much worse for a reduced complexity model as compared to the best-fit model.

In the illustrated drawings of FIGS. 5, 6, 7, the performance of the model in terms of fitting the tuning parameter to the data set levels off (the validation graph in the window 508, 608, 708 levels off toward the right side of the respective graphs), but those skilled in the art will understand that the validation graph 540 often has a more U-shape. Although the performance of the illustrated penalized regression model seems to level off (i.e., the validation likelihood reaches a minimum and then remains fairly flat), it may be advisable to select a model that performs similarly on the validation data, as the tuning parameter handle is moved left to right. Most likely, a desired solution would be to use as simple a model as possible, given a minimum level of performance (i.e., data fit). If interpreting the penalized regression model is important, a simpler model would be much preferable because it is easier to explain. There is also a popular opinion that a simpler model is a better model, because simpler models will generalize better to new data. To a lesser extent, a simpler model helps a user to understand the underlying process of how penalized regression works. This is especially important for teaching these techniques, but it is also important for someone who is new to penalized regression models and who wants to understand how the model changes as the tuning parameter changes. These different aspects of penalized regression models are provided by the embodiments described herein.

Figure 8:
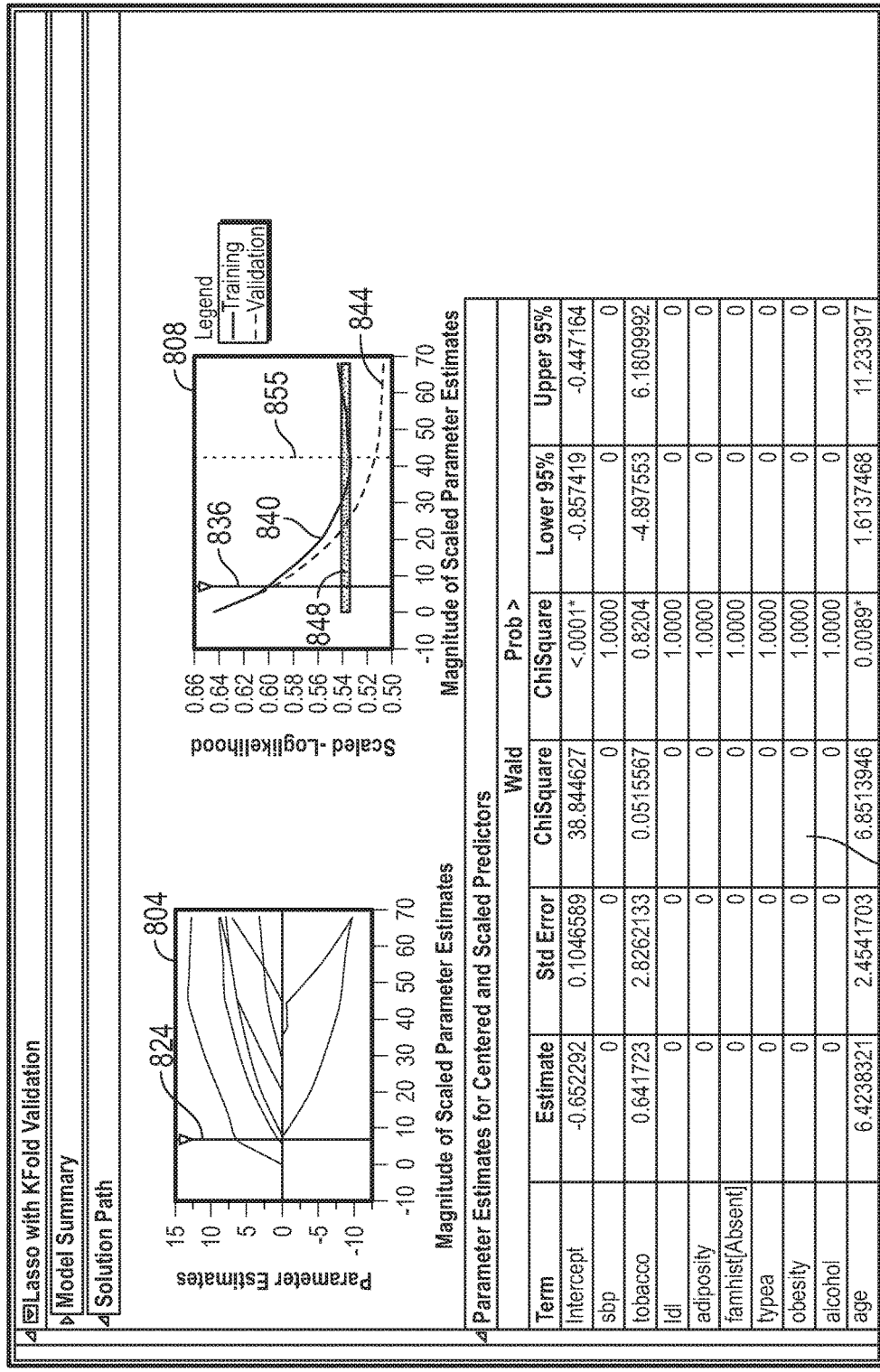
FIG. 8 illustrates an example of a graphical user interface that is configured to be utilized for providing a number of generated graphs related to a data set.

FIG. 8 illustrates an example of a graphical user interface display 800 that is configured to be utilized for providing a number of generated graphs related to a data set. The display 800 shows a solution path window 804 at a left side of the display and shows a tuning parameter fit window 808 on the right side of the display. A parameter estimates data table 812 is shown at the bottom of the display. FIG. 8 shows respective tuning parameter handles 824, 836 that are each shown with a location and corresponding value that are intermediate between the illustrated locations and values of FIGS. 5, 6, and 7. It should be noted that, once again, the changed position of the tuning parameter handle 824, 836 are reflected in different graph window representations 804, 808 and different data table values 812.

Similarly to the illustrations of FIG. 5 and FIG. 6, the illustration of FIG. 7 shows a graph 740 of the validation data outcome in the vicinity of the tuning parameter value, along with a graph 744 of the training data outcome in the vicinity of the tuning parameter value. The validation graph 740 shows how well the penalized regression model fits on the validation data and the training data graph 744 shows how well the penalized regression model, selected according to position of the tuning parameter handle 724, 736 fits on the training data. Similarly to the illustrations of FIG. 5 and FIG. 6, the illustration of FIG. 7 shows a graphical representation of goodness-of-fit for the parameter estimate values of multiple penalized regression models is illustrated in FIG. 7 by the horizontal bar 748. Those skilled in the art will appreciate that the rules for defining the horizontal bar 748 are generally well accepted in the statistics literature. Similarly to the FIG. 6 illustration, the "default" value of the tuning parameter, determined according to a "best fit" data analysis by the system, is represented in FIG. 8 by the dashed vertical line 855 in the tuning parameter fit window 808.

Figure 9:
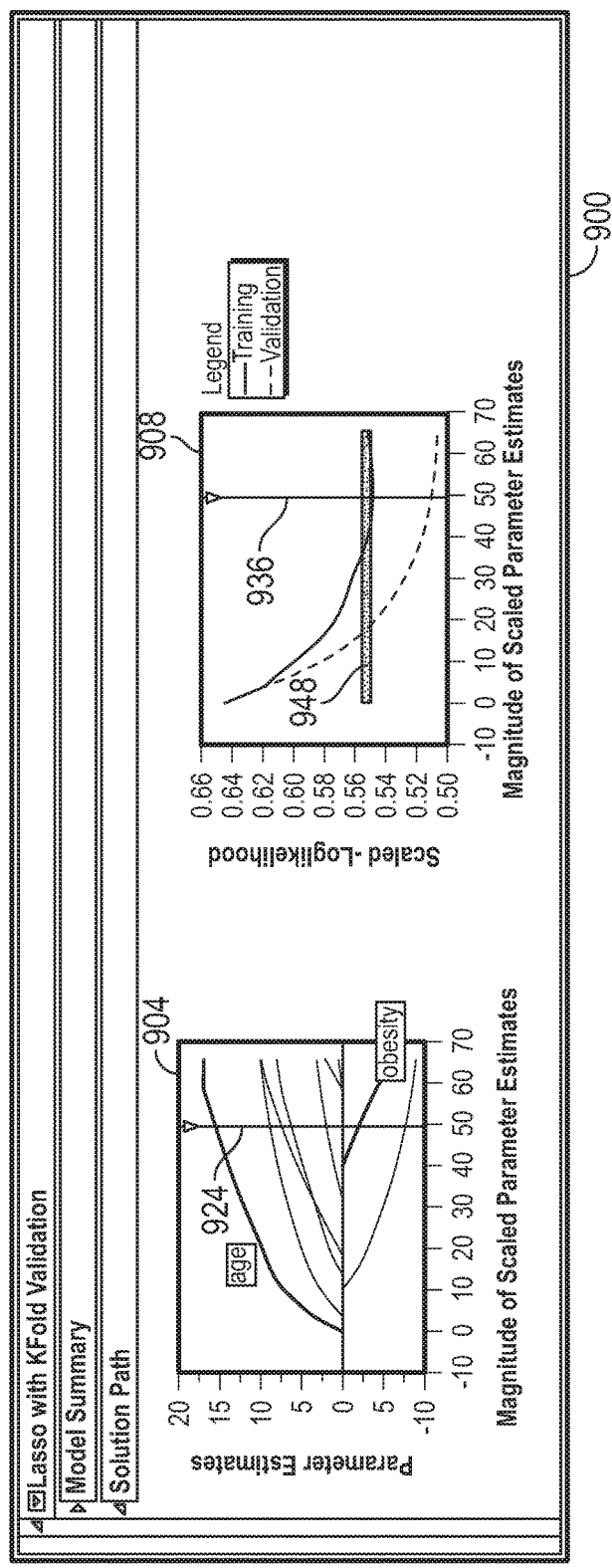
FIG. 9 illustrates an example of a graphical user interface that is configured to be utilized for providing a number of generated graphs related to a data set.

FIG. 9 illustrates an example of a graphical user interface display 900 that is configured to be utilized for providing a number of generated graphs related to a data set. The display 900 shows a solution path window 904 at a left side of the display and shows a tuning parameter fit window 908 on the right side of the display. FIG. 9 shows respective tuning parameter handles 924, 936 that are each shown with a location and corresponding value that are intermediate between the illustrated locations and values of FIGS. 5, 6, 7, and 8. FIG. 9 is intended to illustrate the effects of additional movement of the tuning parameter handles 924, 936 and therefore omits showing a parameter estimates data table, for simplicity. Similarly to the illustrations of FIG. 6 and FIG. 8, the illustration of FIG. 9 shows a graph 940 of the validation data outcome in the vicinity of the tuning parameter value, along with a graph 944 of the training data outcome in the vicinity of the tuning parameter value. The validation graph 940 shows how well the penalized regression model fits on the validation data and the training data graph 944 shows how well the penalized regression model, selected according to position of the tuning parameter handle 1036 fits on the training data. Similarly, FIG. 9 shows a graphical representation of goodness-of-fit for the parameter estimate values of multiple penalized regression models by the horizontal bar 948.

Figure 10:
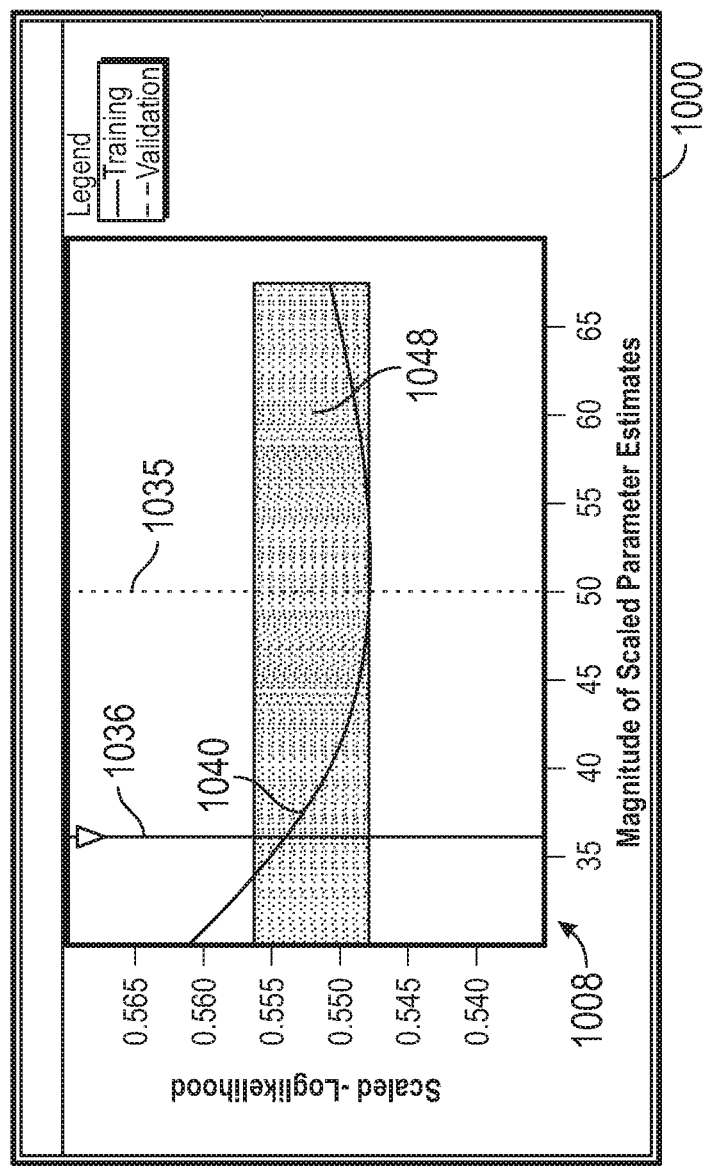
FIG. 10 illustrates an example of a graphical user interface that is configured to be utilized for providing a number of generated graphs related to a data set.

FIG. 10 illustrates an example of a graphical user interface display 1000 that is configured to be utilized for providing a number of generated graphs related to a data set. The display 1000 shows a magnified tuning parameter fit window 1008 otherwise similar to the tuning parameter fit window 908 illustrated in FIG. 9. Similarly to the illustrations of FIG. 6 and FIG. 8, the illustration of FIG. 10 shows a graph 1040 of the validation data outcome in the vicinity of the tuning parameter value, along with a graph 1044 of the training data outcome in the vicinity of the tuning parameter value. The validation graph 1040 shows how well the penalized regression model fits on the validation data and the training data graph 1044 shows how well the penalized regression model, selected according to position of the tuning parameter handle 1036 fits on the training data. Similarly, FIG. 10 shows a graphical representation of goodness-of-fit for the parameter estimate values of multiple penalized regression models by the horizontal bar 1048.

FIG. 10 shows that the graph 1040 for validation goodness of fit at an initial tuning parameter value of approximately 50.0, as indicated by the dashed vertical line 1055, is approximately 0.548 at best. In contrast, the goodness of fit for the modified penalized regression model at a modified tuning parameter value of approximately 37.0, as indicated by the solid vertical line 1036, is approximately 0.555 in the display 1000, a value that is worse because it is slightly higher than the value for the initial tuning parameter value.

In terms of complexity, the complexity of a model as defined as:

$$c(\beta) = \sum_{j=1}^{p} |\hat{\beta}_j|$$

where the $\hat{\beta}_j$ are the estimated coefficients in the regression model. Thus, a first model is said to be simpler (less complex) than a second model when $c(\beta_1)<c(\beta_2)$ in the mathematical expression above. In practical terms, reduced complexity of the first model generally means that the first model has fewer non-zero coefficients than the second model. When a coefficient is set to zero, the parameter or variable associated with that coefficient is effectively dropped from the penalized regression model, leaving a simpler model. This is rather to be expected, as a simpler model would be expected to have fewer terms.

As described above, using the graphing computer system described herein and selecting a data set for estimation according to a penalized regression model will initiate calculation of "best fit" model parameters, producing a best-fit solution path that is stored in memory of the computer system. Also as described above, moving the tuning parameter handle via the graphical user interface display will update the table of parameter estimates in substantially real time, as many of the parameter values are stored in the system as part of the calculation of best fit model or are quickly and easily computed by the system in response to the movement of the tuning parameter handle. Other model results that use the parameter estimates are also updated in response to movement of the tuning parameter handle in the display. Such additional features are illustrated in FIGS. 11 and 12.

Figure 11:
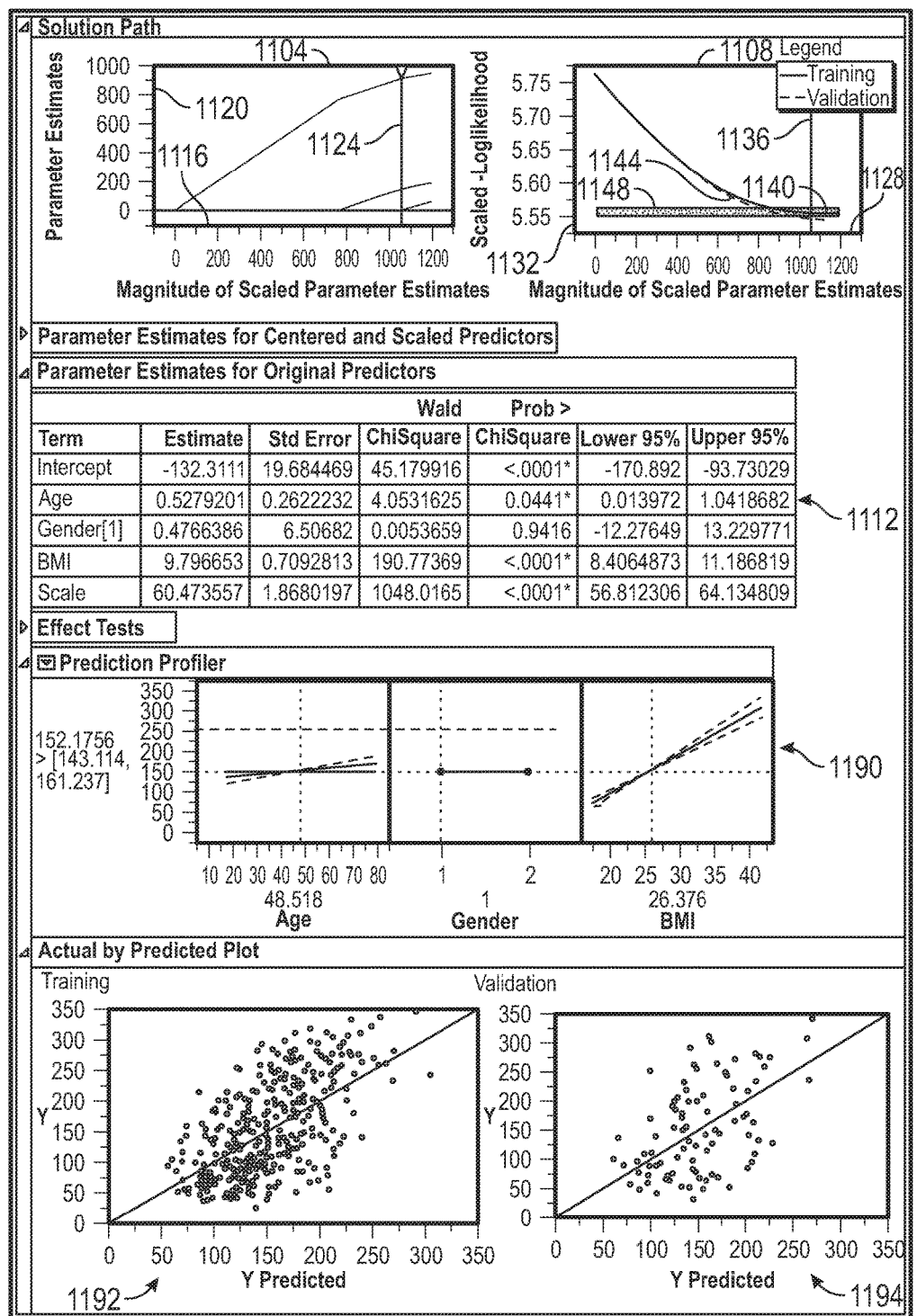
FIG. 11 illustrates an example of a graphical user interface that is configured to be utilized for providing a number of generated graphs related to a data set.

FIG. 11 illustrates an example of a graphical user interface that is configured to be utilized for providing a number of generated graphs related to a data set. FIG. 11 shows a display 1100 that includes a solution path window 1104 at a left side of the display and shows a tuning parameter fit window 1108 on the right side of the display. A parameter estimates data table 1112 is shown beneath the two graph windows 1104, 1108. The solution path window 1104 shows a graph that comprises a representation of values generated according to a penalized regression model for multiple parameters of a data set. The graph in the solution path window 1104 shows the represented values as a graph having a first axis 1116 that represents the magnitude of multiple parameter estimates of the penalized regression model and having a second axis 1120 that represents parameter estimate values of the multiple parameters of the penalized regression model. A tuning parameter handle 1124 is represented in the display 1100 and is movable by a "select-and-drag" operation that is typical for a GUI implementation. The window 1108 shows a first axis 1128 that represents the magnitude of multiple parameter estimates of the penalized regression model and a second axis 1132 that represents parameter estimate values of the multiple parameters of the penalized regression model according to a scaled-log likelihood index or, as noted above, other graph indexes may be utilized.

FIG. 11 also includes a Prediction Profiler table 1190 that is generated by the system according to the parameter estimates that are automatically calculated by the system at the time of generating the penalized regression model solution path. The Prediction Profiler table includes a graph for each model parameter in the table 1112 of parameter estimates for the original predictors. Thus, FIG. 11 shows graphs for the parameters of age, gender, and BMI. FIG. 11 also shows additional graphs, comprising residual graphs 1192, 1194 of predicted values along the horizontal (x) axis and training values along the vertical axis of one graph 1192 and validation values along the vertical axis of the other graph 1194. FIG. 11 illustrates the variety of information for which the system can be configured to provide in the display of solution path.

Figure 12:
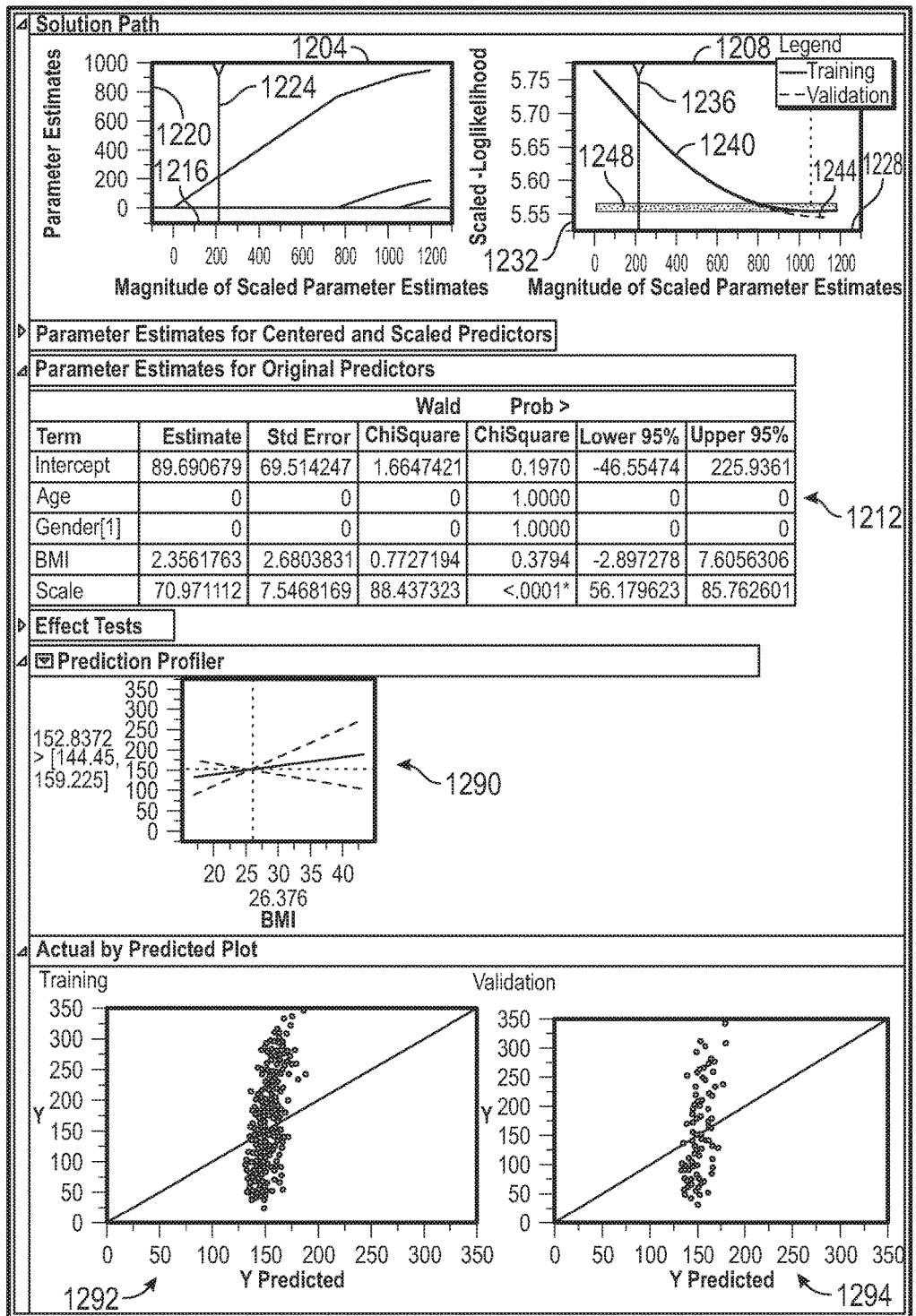
FIG. 12 illustrates an example of a graphical user interface that is configured to be utilized for providing a number of generated graphs related to a data set.

FIG. 12 illustrates an example of a graphical user interface that is configured to be utilized for providing a number of generated graphs related to a data set. FIG. 12 is configured similarly to FIG. 11. In particular, FIG. 12 shows a display 1200 that includes a solution path window 1204 at a left side of the display and shows a tuning parameter fit window 1208 on the right side of the display. A parameter estimates data table 1212 is shown beneath the two graph windows 1204, 1208. The solution path window 1204 shows a graph that comprises a representation of values generated according to a penalized regression model for multiple parameters of a data set. The graph in the solution path window 1204 shows the represented values as a graph having a first axis 1216 that represents the magnitude of multiple parameter estimates of the penalized regression model and having a second axis 1220 that represents parameter estimate values of the multiple parameters of the penalized regression model. A tuning parameter handle 1224 is represented in the display 1200 and is movable by a "select-and-drag" operation that is typical for a GUI implementation. The window 1208 shows a first axis 1228 that represents the magnitude of multiple parameter estimates of the penalized regression model and a second axis 1232 that represents parameter estimate values of the multiple parameters of the penalized regression model according to a scaled-log likelihood index or, as noted above, other graph indexes may be utilized.

FIG. 12 shows a penalized regression model that is much simpler than the model illustrated in FIG. 11, in terms of coefficients for the penalized regression model used to represent the data set.

FIG. 12 includes a Prediction Profiler table 1290 that is generated by the system according to the parameter estimates that are automatically calculated by the system at the time of generating the penalized regression model solution path. The Prediction Profiler table includes a graph for each model parameter in the table 1212 of parameter estimates for the original predictors. In the FIG. 12 model, the parameters for age and gender are set to zero in the table 1212. Thus, FIG. 12 shows graphs in the Prediction Profiler portion 1290 of the display only for the parameter of BMI. FIG. 12 also shows the additional graphs comprising residual graphs 1292, 1294 of predicted values along the horizontal (x) axis and training values along the vertical axis of one graph 1292 and validation values along the vertical axis of the other graph 1294. The FIG. 12 Prediction Profiler section 1290 and residual graphs 1292, 1294 show the ramifications of the much simpler regression model as compared to the model illustrated in FIG. 11.

The multiple coefficient lines in the display can get relatively busy and can make it somewhat difficult to identify which coefficient line corresponds to which parameter estimate. See, for example, the FIG. 5 coefficient lines in the left window 504 and the table 512 of parameter estimates, the FIG. 6 coefficient lines in the left window 604 and the table 612 of parameter estimates, and the FIG. 7 coefficient lines in the left window 704 and the table 712 of parameter estimates. Thus, using a static graph to identify which coefficient line corresponds to which parameter estimate can be difficult. In the system disclosed herein, the task is made easier because the system provides a user of the GUI interface with an identification feature, The identification feature enables the user to click in the left window 1304 of the display on a coefficient line of interest, whereupon the system will highlight the clicked coefficient line and will identify and highlight the corresponding row in the table 1312. The reverse operation is supported as well, so that the identification feature enables a user to click on a row in the parameter estimates table 1312 and, in response, the system will highlight the row in the table and also will identify and highlight the corresponding coefficient line in the graph window 1304. The system also supports pinning a label on the identified coefficient line.

Figure 13:
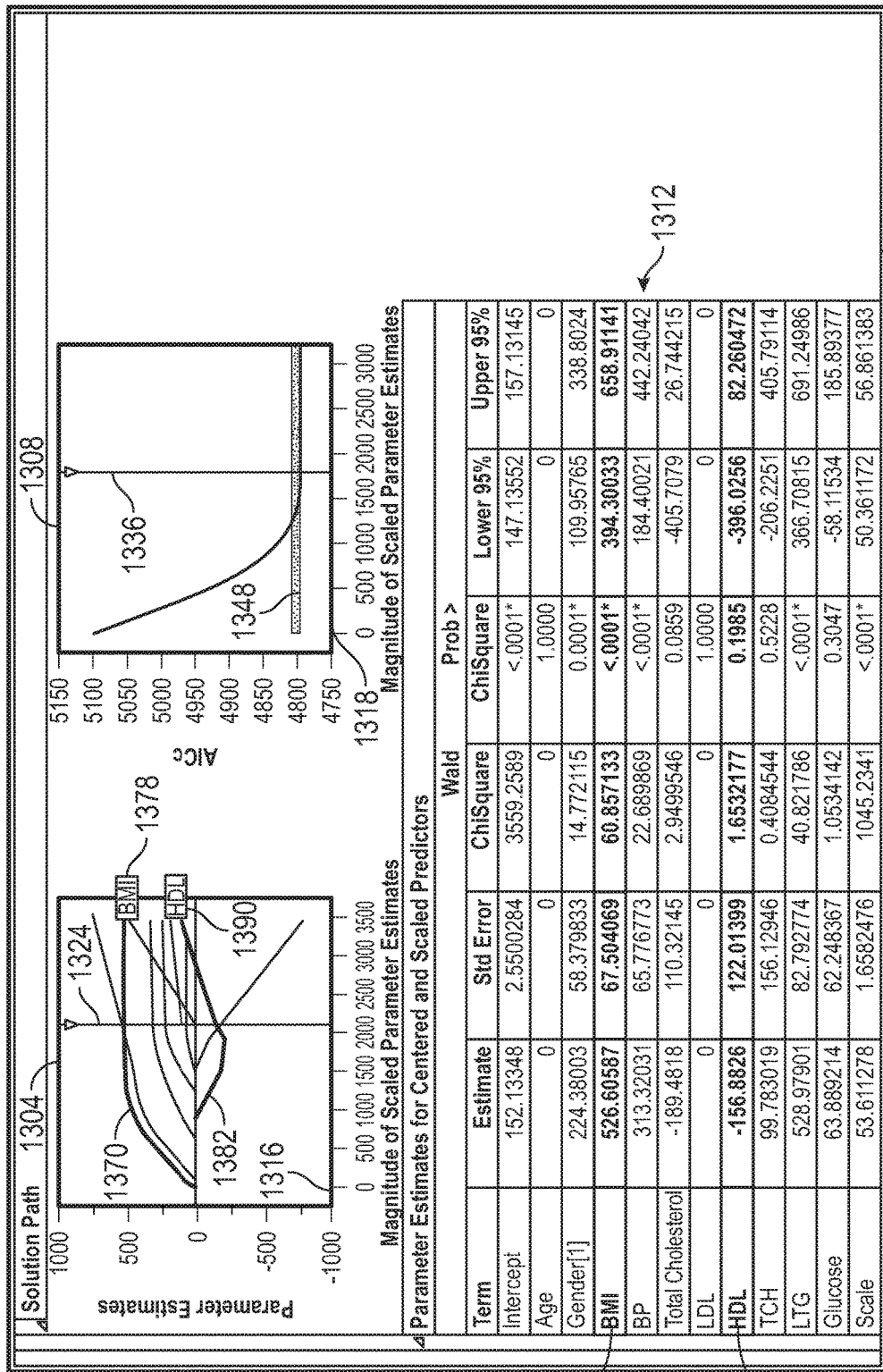
FIG. 13 illustrates an example of a graphical user interface with an identification feature for identifying coefficient lines and corresponding parameter estimates.

FIG. 13 illustrates the use of the identification feature described above. FIG. 13 illustrates an example of a graphical user interface display 1300 that is configured to be utilized for providing a number of generated graphs related to a data set. The display 1300 shows a solution path window 1304 at a left side of the display and shows a partial view of a tuning parameter fit window 1308 on the right side of the display. A parameter estimates data table 1312 is shown at the bottom of the display. FIG. 13 shows respective tuning parameter handles 1324, 1336 that are each shown with a location and corresponding value relative to the X-axis 1316, 1318. FIG. 13 also shows the horizontal bar 1348 that defines a range of values of the tuning parameter where the model would be expected to fit as well as the best model.

FIG. 13 illustrates the identification feature described above, and shows a highlighted coefficient line 1370 with a highlighted corresponding row 1374 in the parameter estimates table 1312. FIG. 13 also shows a label "BMI" 1378 that a user has pinned to the coefficient line 1370 using the GUI. FIG. 13 also shows a second highlighted coefficient line 1382 with a highlighted corresponding row 1386 in the parameter estimates table 1312. FIG. 13 also shows a label "HDL" 1390 that a user has pinned to the coefficient line 1382 using the GUI. As noted above, the identification feature can produce the highlighted display 1300 either by first clicking on a coefficient line or by first clicking on a data row.

Thus, in the disclosed technique, a user input is received that comprises a request for changing the graphical display of the representation of values. The received user input request comprises a change to a parameter handle of the graphical display, such that the change in the parameter handle indicates a change to at least one data parameter of the penalized regression model. Changes to the represented values of the penalized regression model are calculated in response to the received user input request. The graphical display is changed such that the graphical display shows a representation of the values for the penalized regression model in accordance with the calculated changes.

The techniques disclosed herein provide an interactive graph in a graphing computer system that allows a user to explore the penalized regression solution path. By dragging a handle in the graph, the model is updated in substantially real time. This gives the user the power to modify the resulting predictive model. For example, the user may be willing to accept a model that performs slightly worse if it is much easier to interpret.

By using the disclosed technique, a user of the graphing computer system can click on and drag the tuning parameter handle in the GUI to change the resulting penalized regression model. This allows the user to investigate a model other than the best fit model. Generally, such investigation involves a penalized regression model that is simpler than a best-fit solution path that would ordinarily be determined and used as the default penalized regression model. The disclosed technique is useful in discovering and experimenting with models, other than the overall best-fit model, such that the investigated model can be identified that only performs slightly worse than the default best-fit model. This investigated, best-fit-alternative solution allows users to address the situation where they have a best fit but want to modify it slightly in a way that does not badly degrade performance of the best-fit model. By being able to explore how changes to the tuning parameter impact the best-fit model by just interacting with the graph, users are saved much time and effort. In this way, the disclosed techniques allow relatively quick and easy building and reviewing and testing of alternate penalized regression models. By exploring such alternate models in the solution path, it is more likely to obtain a model that not only predicts well, but is also more meaningful and easier to interpret.

Example Embodiments

Systems and methods according to some examples may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to, or from, a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. The processing devices and program instructions may involve, for example, the "JMP" statistical discovery software for data visualization that is available from SAS Institute Inc. and that can operate in a variety of computer operating systems.

The system and method data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, removable memory, flat files, temporary memory, databases, programming data structures, programming variables, IF-THEN (or similar type) statement constructs, etc.). It is noted that data structures may describe formats for use in organizing and storing data in databases, programs, memory, or other computer-readable media for use by a computer program.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows and figures described and shown in this specification can be performed by one or more programmable processors executing one or more computer programs to perform functions by operating on input data and generating output.

Generally, a computer can also include, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, (e.g., a mobile telephone, a personal digital assistant (PDA), a tablet, a mobile viewing device, a mobile audio player, a Global Positioning System (GPS) receiver), to name just a few. Computer-readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks; magneto optical disks; and CD ROM and DVD-ROM disks). The processor and the memory can be supplemented by, or incorporated in, special purpose logic circuitry.

The computer components, software modules, functions, data stores and data structures described herein may be connected directly or indirectly to each other in order to allow the flow of data needed for their operations. It is also noted that a module or processor includes, but is not limited to, a unit of code that performs a software operation, and can be implemented, for example, as a subroutine unit of code, or as a software function unit of code, or as an object (as in an object-oriented paradigm), or as an applet, or in a computer script language, or as another type of computer code. The software components or functionality may be located on a single computer or distributed across multiple computers depending upon the situation at hand.

The computer may include a programmable machine that performs high-speed processing of numbers, as well as of text, graphics, symbols, and sound. The computer can process, generate, or transform data. The computer includes a central processing unit that interprets and executes instructions; input devices, such as a keyboard, keypad, or a mouse, through which data and commands enter the computer; memory that enables the computer to store programs and data; and output devices, such as printers and display screens, that show the results after the computer has processed, generated, or transformed data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products (i.e., one or more modules of computer program instructions encoded on a computer-readable medium for execution by, or to control the operation of, data processing apparatus). The computer-readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question (e.g., code that constitutes processor firmware, a protocol stack, a graphical system, a database management system, an operating system, or a combination of one or more of them).

While this disclosure may contain many specifics, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be utilized. Moreover, the separation of various system components in the implementations described above should not be understood as requiring such separation in all implementations, and it should be understood that the described program components and systems can generally be integrated together in a single software or hardware product or packaged into multiple software or hardware products.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situations where only the disjunctive meaning may apply.

What is claimed is:

1. A computer program product tangibly embodied in a non-transitory machine-readable storage medium that includes instructions configured to be executed to cause a data processing apparatus to perform a method comprising:
   presenting a graphical display that shows a representation of values generated according to a penalized regression model for multiple parameters of a data set, wherein the represented values of the graphical display show a graph having a first axis that represents magnitudes of multiple parameter estimates of the penalized regression model and having a second axis that represents parameter estimate values of the multiple parameters of the penalized regression model;
   receiving a user input request for changing the graphical display of the representation of values, wherein the received user input request comprises a change to a parameter handle of the graphical display such that the change to the parameter handle indicates a change to at least one data parameter of the penalized regression model;
   calculating changes to the represented values of the penalized regression model in response to the received user input request; and
   changing the graphical display such that the changed graphical display shows a second representation of the values for the penalized regression model in accordance with the calculated changes.

2. The computer program product of claim 1, wherein the presented graphical display further includes a data table of parameter estimates for predictor values of the penalized regression model that are changed in response to the received user input request.

3. The computer program product of claim 1, wherein the received user input request comprises a movement of the parameter handle in the graphical display representation from an initial position of the parameter handle to a changed position that indicates a change in at least one of the data parameters.

4. The computer program product of claim 3, wherein the parameter handle movement is responsive to a user click-and-drag operation in the graphical display.

5. The computer program product of claim 3, wherein the parameter handle comprises a line segment parallel to the second axis of the graphical display and the received user input request comprises a movement of the line segment along the first axis.

6. The computer program product of claim 1, wherein the graphical display of the representation of the values according to the penalized regression model shows a plurality of data plots, each data plot corresponding to a different parameter of the data set from which the penalized regression model was generated.

7. The computer program product of claim 1, wherein calculating changes to the representation of the values comprises calculating changes to a fitted model of the penalized regression model in response to the received user input request.

8. The computer program product of claim 1, wherein the calculated changes generate a change to the regression model that is not an optimal fit of the data set to the penalized regression model.

9. The computer program product of claim 2, wherein the parameter estimates of the data table are updated in response to the received user input request.

10. The computer program product of claim 1, wherein the changed graphical display includes a graphical representation of a best-fit combination of values of the represented values, and wherein the received user input request is indicated in the changed graphical display as a second graphical representation that is independent of the graphical representation of the best-fit combination of values.

11. The computer program product of claim 1, wherein the graphical display further includes a graphical representation of goodness-of-fit of data values to the representation of the values, in response to the received user input.

12. The computer program product of claim 11, wherein the graphical representation of goodness-of-fit includes a third axis that represents the magnitude of the multiple parameter estimates of the penalized regression model and a fourth axis that represents an enlarged resolution scale of the parameter estimate values of the multiple parameters of the penalized regression model.

13. The computer program product of claim 12, wherein the enlarged resolution scale comprises a log scale.

14. The computer program product of claim 1, wherein the parameter handle corresponds to a tuning parameter of the penalized regression model.

15. The computer program product of claim 14, wherein training and validation data lines are shown in the displayed presentation.

16. A graphing computer system, the graphing computer system comprising:
   a processor; and
   a non-transitory machine-readable storage medium that includes instructions that are configured to be executed by the processor such that, when executed, the instructions cause the graphing computer system to perform operations including:
      presenting a graphical display that shows a representation of values generated according to a penalized regression model for multiple parameters of a data set, wherein the represented values of the graphical display show a graph having a first axis that represents magnitudes of multiple parameter estimates of the penalized regression model and having a second axis that represents parameter estimate values of the multiple parameters of the penalized regression model;
      receiving a user input request for changing the graphical display of the representation of values, wherein the received user input request comprises a change to a parameter handle of the graphical display such that the change to the parameter handle indicates a change to at least one data parameter of the penalized regression model;
calculating changes to the represented values of the penalized regression model in response to the received user input request; and
changing the graphical display such that the changed graphical display shows a second representation of the values for the penalized regression model in accordance with the calculated changes.

17. The graphing computer system of claim 16, wherein the presented graphical display further includes a data table of parameter estimates for predictor values of the penalized regression model that are changed in response to the received user input request.

18. The graphing computer system of claim 16, wherein the received user input request comprises a movement of the parameter handle in the graphical display representation from an initial position of the parameter handle to a changed position that indicates a change in at least one of the data parameters.

19. The graphing computer system of claim 18, wherein the parameter handle movement is responsive to a user click-and-drag operation in the graphical display.

20. The graphing computer system of claim 18, wherein the parameter handle comprises a line segment parallel to the second axis of the graphical display and the received user input request comprises a movement of the line segment along the first axis.

21. The graphing computer system of claim 16, wherein the graphical display of the representation of the values according to the penalized regression model shows a plurality of data plots, each data plot corresponding to a different parameter of the data set from which the penalized regression model was generated.

22. The graphing computer system of claim 16, wherein calculating changes to the representation of the values comprises calculating changes to a fitted model of the penalized regression model in response to the received user input request.

23. The graphing computer system of claim 16, wherein the calculated changes generate a change to the regression model that is not an optimal fit of the data set to the penalized regression model.

24. The graphing computer system of claim 17, wherein the parameter estimates of the data table are updated in response to the received user input request.

25. The graphing computer system of claim 16, wherein the changed graphical display includes a graphical representation of a best-fit combination of values of the represented values and wherein the received user input request is indicated in the changed graphical display as a second graphical representation that is independent of the graphical representation of the best-fit combination of values.

26. The graphing computer system of claim 16, wherein the graphical display further includes a graphical representation of goodness-of-fit of data values to the representation of the values, in response to the received user input request.

27. The graphing computer system of claim 26, wherein the graphical representation of goodness-of-fit includes a third axis that represents the magnitude of the multiple parameter estimates of the penalized regression model and a fourth axis that represents an enlarged resolution scale of the parameter estimate values of the multiple parameters of the penalized regression model.

28. The graphing computer system of claim 27, wherein the enlarged resolution scale comprises a log scale.

29. The graphing computer system of claim 16 wherein the parameter handle corresponds to a tuning parameter of the penalized regression model.

30. The graphing computer system of claim 29, wherein training and validation data lines are shown in the displayed presentation.

31. A method of operating a graphing computer system for generating an interactive graph, the method comprising:
presenting a graphical display that shows a representation of values generated according to a penalized regression model for multiple parameters of a data set, wherein the represented values of the graphical display show a graph having a first axis that represents magnitudes of multiple parameter estimates of the penalized regression model and having a second axis that represents parameter estimate values of the multiple parameters of the penalized regression model;
receiving a user input request for changing the graphical display of the representation of values, wherein the received user input request comprises a change to a parameter handle of the graphical display such that the change to the parameter handle indicates a change to at least one data parameter of the penalized regression model;
calculating changes to the represented values of the penalized regression model in response to the received user input request; and
changing the graphical display such that the changed graphical display shows a second representation of the values for the penalized regression model in accordance with the calculated changes.

32. The method of claim 31, wherein the presented graphical display further includes a data table of parameter estimates for predictor values of the penalized regression model that are changed in response to the received user input request.

33. The method of claim 31, wherein the received user input request comprises a movement of the parameter handle in the graphical display representation from an initial position of the parameter handle to a changed position that indicates a change in at least one of the data parameters.

34. The method of claim 33, wherein the parameter handle movement is responsive to a user click-and-drag operation in the graphical display.

35. The method of claim 33, wherein the parameter handle comprises a line segment parallel to the second axis of the graphical display and the received user input request comprises a movement of the line segment along the first axis.

36. The method of claim 31, wherein the graphical display of the representation of the values according to the penalized regression model shows a plurality of data plots, each data plot corresponding to a different parameter of the data set from which the penalized regression model was generated.

37. The method of claim 31, wherein calculating changes to the representation of the values comprises calculating changes to a fitted model of the penalized regression model in response to the received user input request.

38. The method of claim 31, wherein the calculated changes generate a change to the regression model that is not an optimal fit of the data set to the penalized regression model.

39. The method of claim 32, wherein the parameter estimates of the data table are updated in response to the received user input request.

40. The method of claim 31, wherein the changed graphical display includes a graphical representation of a best-fit combination of values of the represented values and wherein the received user input request is indicated in the changed graphical display as a second graphical representation that is independent of the graphical representation of the best-fit combination of values.

41. The method of claim 31, wherein the graphical display further includes a graphical representation of goodness-of-fit of data values to the representation of the values, in response to the received user input request.

42. The method of claim 41, wherein the graphical representation of goodness-of-fit includes a third axis that represents the magnitude of the multiple parameter estimates of the penalized regression model and a fourth axis that represents an enlarged resolution scale of the parameter estimate values of the multiple parameters of the penalized regression model.

43. The method of claim 42, wherein the enlarged resolution scale comprises a log scale.

44. The method of claim 31, wherein the parameter handle corresponds to a tuning parameter of the penalized regression model.

45. The method of claim 44, wherein training and validation data lines are shown in the displayed presentation.

* * * * *